W. L. JEFFRIES.
Plow Carriage.
No. 88,486.
Patented Mar. 30, 1869.
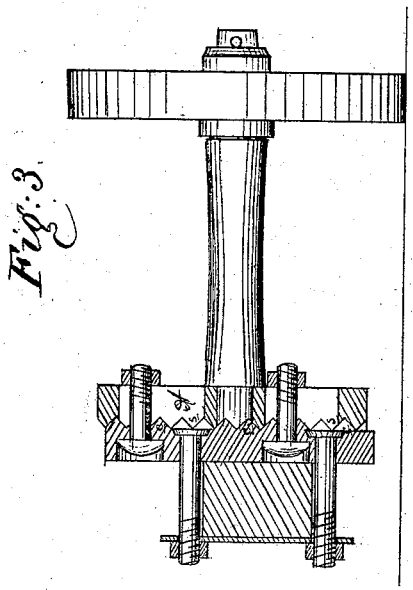
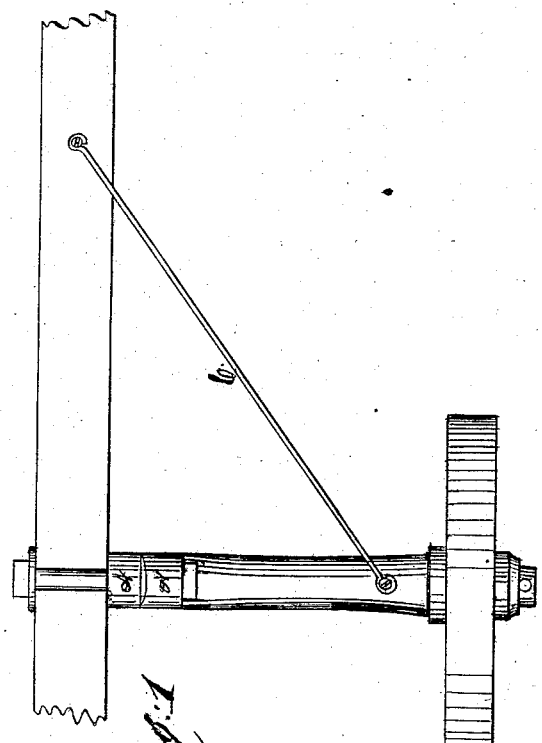
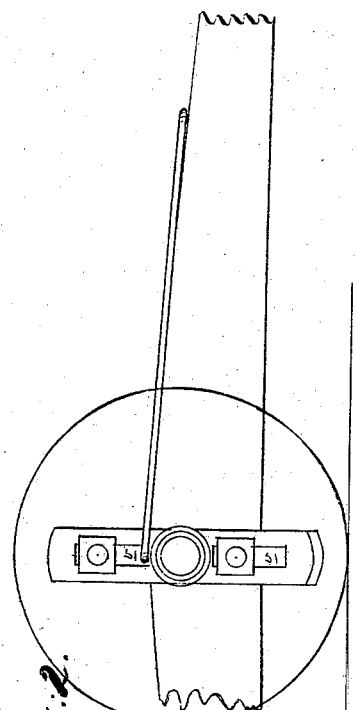
Witnesses
Inventor
W. L. Jeffries

W. L. JEFFRIES, OF LANCASTER, OHIO.

Letters Patent No. 88,486, dated March 30, 1869.

IMPROVEMENT IN PLOW-CARRIAGES.

The Schedule referred to in these Letters Patent and making part of the same.

*To all whom it may concern:*

Be it known that I, W. L. JEFFRIES, of the city of Lancaster, in the county of Fairfield, and State of Ohio, have invented a new and valuable Improvement in Plow-Carriages; and I do hereby declare that the following is a full, clear, and exact description of the construction and operation of the same, reference being had to the annexed drawings, making a part of this specification, and to the letters and figures of reference marked thereon.

Figure 1 of the drawings is a plan view of my invention.

Figure 2 is a side elevation of the same.

Figure 3 is a section thereof.

My invention has relation to plows attached to wheels; and

It consists in novel and efficient means of raising or lowering the wheels, at will.

It will be readily perceived that when a plow is connected with wheels, if the furrow be of great depth, the wheel that runs on the plowed ground will be raised to a greater height than when the furrow is shallow.

This fact renders it essential to devise some means for adapting the position of the plow-beam to the position of the wheels when thus raised or lowered by a deep or shallow furrow.

To accomplish this object, I have invented the device shown on the drawings, which is described as follows:

To a plow-beam, immediately forward of the bolt, I affix a clamp, marked A on the drawings, secured above and below the beam by bolts, nuts, and screws, as shown.

The inner side of this clamp extends a foot, more or less, above and below the beam, and its outer side is notched, in the form of a ratchet, as represented. I call this inner side of the clamp the ratchet $c$.

I construct another ratchet, which I call the ratchet $s$, and adjust it with the ratchet $c$, in the manner shown in fig. 3, connecting the two by means of the bolts, nuts, and screws, as said figure represents.

The axle, or shaft for the wheel, designed to move upon the plowed ground, is attached, at its inner end, firmly to the centre of this ratchet $s$.

The letters $v$ are slots, formed in the ratchet $s$, both above and below the wheel-shaft.

The letter C is a brace, extending from a point near the front end of the plow-beam to a point near the wheel upon the shaft thereof.

My device is operated as follows, viz:

To raise or lower the carriage-wheel, I unscrew the nuts from the bolts uniting ratchets $c$ and $s$, and adjust the two ratchets by their teeth in the desired position, the slots in ratchet $s$ serving as means for such adjustment. I then return the nuts to their appropriate threads, and the work is accomplished.

What I claim as my invention, and desire to secure by Letters Patent, is—

The ratchets $c$ and $s$, when constructed, combined, and operating substantially as and for the purposes specified.

In testimony that I claim the above, I have hereunto subscribed my name, in the presence of two witnesses.

W. L. JEFFRIES.

Witnesses:
W. A. SHULTZ,
A. ZINK.